Feb. 7, 1928.

J. ROGGINGER 1,658,257

MEASURING AND DISPENSING MEANS FOR CONTAINERS

Filed July 6, 1925

Inventor
JOHN ROGGINGER
By A. B. Bowman
Attorney

Patented Feb. 7, 1928.

1,658,257

UNITED STATES PATENT OFFICE.

JOHN ROGGINGER, OF SAN DIEGO, CALIFORNIA, ASSIGNOR TO NORCO MFG. CO., OF NORCO, CALIFORNIA, A CORPORATION OF CALIFORNIA.

MEASURING AND DISPENSING MEANS FOR CONTAINERS.

Application filed July 6, 1925. Serial No. 41,619.

My invention relates to a measuring and dispensing means for containers, and the objects of my invention are: First, to provide a means of this class in the form of a readily removable cover for containers, such as conventional glass jars, for measuring a definite amount of the contents thereof and then dispensing said measured contents; second, to provide a means of this class to be positioned or secured at the open ends of inverted containers for measuring and dispensing the contents of said containers by a unitary handle means; third, to provide a means of this class having a measuring chamber with a pair of openings, cover members shiftably mounted over said openings, and unitary handle means for separately shifting the cover members to their open position; fourth, to provide a means of this class in the form of a cylindrical measuring compartment having shiftable cover plates at its opposite ends, one within the container to which the chamber member is secured, the cover members being separately shiftable in opposite directions by the alternate shifting of a unitary handle means; fifth, to provide as a whole a novelly constructed measuring and dispensing means for containers, and sixth, to provide a means of this class which is very simple and economical of construction, durable, efficient, compact, easy to operate, and which will not readily deteriorate or get out of order.

Figure 1:
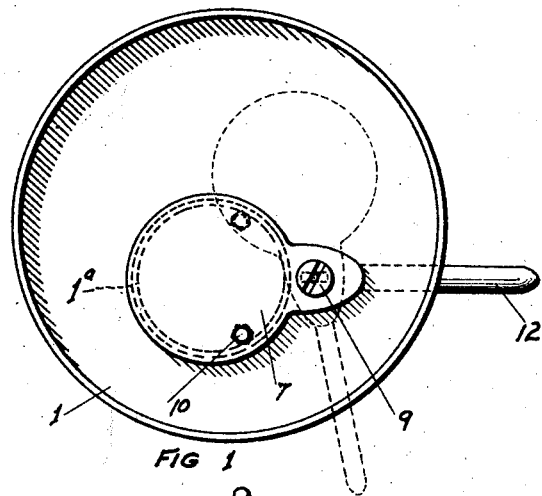
Figure 2:
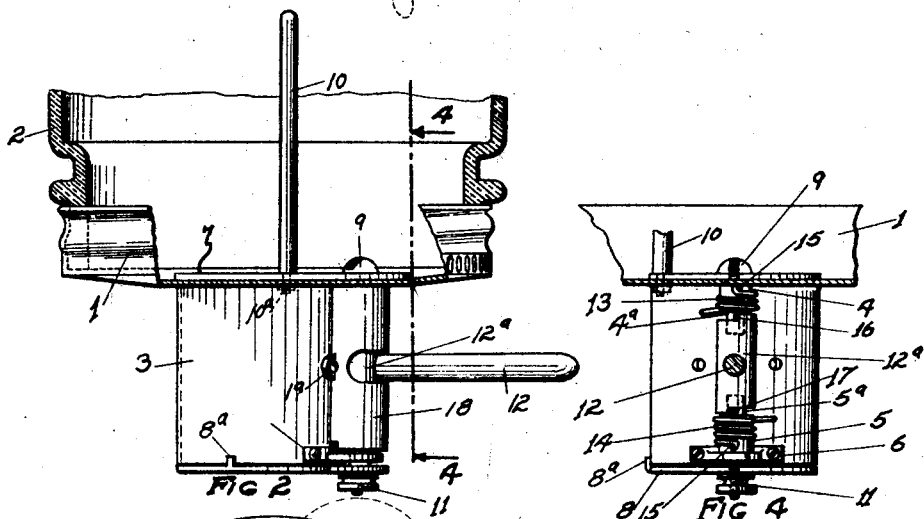
Figure 4:
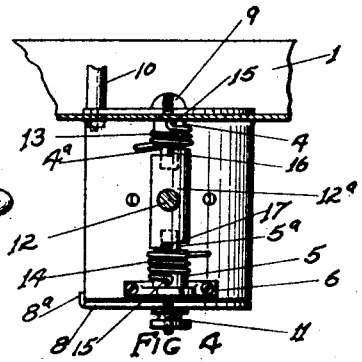
Figure 3:
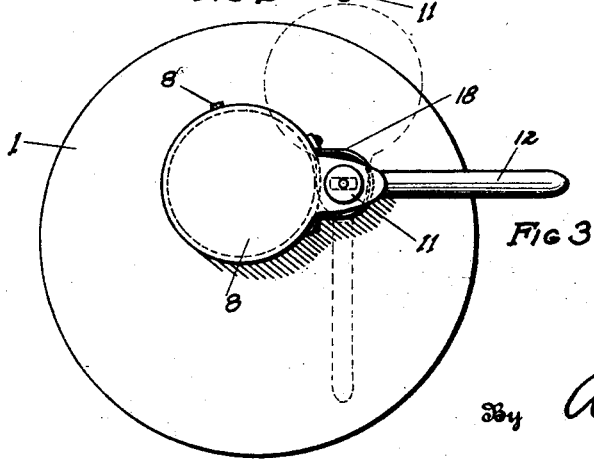

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my measuring and dispensing means in its preferred form of construction, separate and apart from a container to which it is adapted to be connected, one of the cover members and the handle member being shown by dotted lines in an open position; Fig. 2 is a side elevational view thereof, showing the same in connection with a fragmentary portion of a conventional glass jar in section, and showing certain parts and portions of the means broken away and in section to facilitate the illustration; Fig. 3 is a bottom view thereof, also showing by dotted lines the lower cover member and the handle shifted to their open positions, and Fig. 4 is a partial sectional and partial elevational view thereof, taken through 4—4 of Fig. 2, showing one of the members thereof removed to facilitate the illustration.

Like characters of reference refer to similar parts and portions throughout the several views of the drawings.

Referring to the drawings, 1 is a cover adapted to be screwably secured over the open end of a conventional glass jar 2, shown fragmentarily and in section in Fig. 2. The cover 1 is similar in construction to those now in use for such glass jars. When desiring to measure and dispense the contents from the container or jar 2, the same is inverted or supported in an inverted position, as shown in Fig. 2. In the head end of the cover 1 is provided an opening $1^a$ which communicates with the interior of the cylindrically shaped measuring compartment member 3 secured to the cover 1. At the one side of the cylindrical member 3 is rotatably mounted, in axial alinement with each other, a pair of studs 4 and 5, each provided with reduced portions near their outer ends which extend, respectively, through the head end of the cover 1 and through a bracket 6 secured at the lower end of the side of the cylindrical measuring member 3, as shown best in Fig. 4. The portions of the studs 4 and 5 extending, respectively, through the head end of the cover 1 and the bracket 6 are flattened, as shown best in Figs. 1 and 3. Over the flattened portion of the stud 4 is secured the cover member or plate 7, by means of a nut 9 secured over the threaded end of the stud 4. Said plate 7 is normally positioned in the solid line position shown in Fig. 1 for covering the opening $1^a$, and is adapted to be shifted to the dotted line position, as will be described later. Near the edge at one side of the cover plate 7 is secured a rod 10 which extends through the cover plate and is secured at the under side by means of a nut $10^a$. Said nut $10^a$ is adapted to serve as a stop against the inside wall of the cylindrical measuring member 3 for both positions of the cover plate 7, as shown best in Fig. 1. The rod 10 extends a considerable distance upwardly from the cover plate 7 and is adapted to agitate the coffee or other product in the container 2 to facilitate the discharge of the same into the measuring compartment member 3 when shifting the cover plate 7 to one side. Over the opening at the lower end of the member 3 is positioned another cover plate 8 which is secured over a corresponding flat portion at the outer end of the stud 5, by means of a nut 11. The cover plate 8 is normally held in a closed position by an upwardly turned lug 8ª of the cover plate 8, which lug is adapted to engage the outer side of the measuring member 3. The studs 4 and 5 are provided, respectively, with a downwardly extending reduced portion 4ª and an upwardly extending reduced portion 5ª on which are mounted the opposite ends of the cross portion at the one end of the handle member 12. Around the studs 4 and 5 are respectively positioned coil springs 13 and 14, the one end of each being secured to a pin 15 in the respective studs, and the other ends of which bear against the outer side of the cylindrical measuring member 3, as shown best in Fig. 4. In the studs 4 and 5 are provided stop members or pins 16 and 17, respectively, which are adapted to engage shoulders at the opposite ends of the cross portion 12ª of the handle 12.

Over the studs 4 and 5, the springs positioned around the same and the cross portion of the handle member 12 is positioned a cover 18 which is secured to the member 3 by means of screws 19.

It will be seen from the drawings and from the above description that when desiring to measure a certain amount of the contents of the container 2, the handle 12 is shifted from the solid to the dotted line position, shown in Fig. 1, which permits the shoulder or offset portion at the upper end of the cross portion of the handle 12 to engage the pin 16 and rotate the same in a clockwise direction, uncovering the opening 1ª in the head end of the cover 1. The spring 13 automatically returns the cover member 7 to the closed position over the opening 1ª. The handle 12 is then shifted in the opposite direction, or from the solid to the dotted line position shown in Fig. 3, in which case the offset portion at the lower end of the cross portion of the handle member 12 engages the pin 17 which rotates the stud 5 and shifts the cover plate 8 from the solid to the dotted line position shown in Fig. 3, thus dispensing the contents of the container 2 measured out in the cylindrical measuring member 3.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a measuring means, a chamber member provided with openings at its opposite ends, cover members pivotally mounted over said openings at the opposite ends of said chamber member on axes parallel with the longitudinal axis of said chamber member forming a tight enclosure with the latter, springs in connection with said cover members for normally holding the same over the openings in said chamber member, and a unitary handle means in connection with said cover members for separately shifting the same to their open positions relatively to said chamber member against the action of their respective springs.

2. In a means of the class described, the combination with a container, of a measuring member open at its opposite ends, one of the openings thereof communicating with an opening in said container, cover members shiftably mounted at the opposite ends of said measuring member, handle means for independently actuating said cover members, an agitating means extending into said container from one side of the cover member mounted over the opening communicating with the opening in the container, and means at the opposite side of said cover for securing said agitating means in position, said securing means serving as a stop for the cover member to which it is attached to limit the open and closed positions of said cover member.

3. In a dispensing and measuring means, a tubular chamber member open at its opposite ends, cover members pivotally mounted at the opposite ends of said tubular chamber member over the openings thereof on axes parallel with the vertical axis of said chamber member, and a unitary handle means for separately and independently shifting said cover members to their open positions when shifting said handle means in opposite directions.

4. In a dispensing and measuring means, a tubular chamber member open at its opposite ends, cover members pivotally mounted at the opposite ends of said tubular chamber member over the openings thereof on axes in alinement with each other and parallel with said chamber member, a handle member pivotally mounted in alinement with the axes of rotation of said cover members, stop means in connection with said handle member for independently shifting said cover members, and springs at the pivotal axes of said cover members for normally holding the same in their closed positions over the openings at the opposite ends of said tubular chamber member.

5. In a measuring and dispensing means of the class described, the combination with a container, of a cover adapted to be secured over the open end of said container, a measuring chamber member secured to and extending outwardly from said cover adapted to communicate at its inner end with said container and open at its outer end, cover plates pivotally mounted over the open ends of said measuring chamber member on axes parallel with the axis of said chamber member, and a handle member pivotally mounted on an axis in alinement with the pivotal axes of said cover plates for alternately shifting the same to their open positions with the alternate shifting of said handle member.

6. In a means of the class described, the combination with a container, of a measuring member open at its opposite ends, one of the openings thereof communicating with an opening in said container, cover members shiftably mounted at the opposite ends of said measuring member, handle means for independently actuating said cover members, and an agitating means rigidly mounted on the cover member positioned over the opening communicating with the opening in the container, and shiftable with said cover and extending therefrom into said container.

In testimony whereof, I have hereunto set my hand at San Diego, California, this 22d day of June, 1925.

JOHN ROGGINGER.